US008891512B2

(12) United States Patent
Hsieh et al.

(10) Patent No.: US 8,891,512 B2
(45) Date of Patent: Nov. 18, 2014

(54) METHOD OF HANDLING A VOIP CONNECTION OF A MOBILE DEVICE AND RELATED COMMUNICATION DEVICE

(75) Inventors: Wen-Jui Hsieh, Taoyuan County (TW); Ching-Hao Lee, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 60 days.

(21) Appl. No.: 13/589,183

(22) Filed: Aug. 20, 2012

(65) Prior Publication Data

US 2013/0044656 A1    Feb. 21, 2013

Related U.S. Application Data

(60) Provisional application No. 61/525,206, filed on Aug. 19, 2011.

(51) Int. Cl.
| *H04L 12/66* | (2006.01) |
| *H04L 12/28* | (2006.01) |
| *H04M 15/00* | (2006.01) |
| *H04L 12/14* | (2006.01) |
| *H04M 1/725* | (2006.01) |
| *H04W 76/02* | (2009.01) |

(52) U.S. Cl.
CPC ....... *H04M 15/8038* (2013.01); *H04L 12/1403* (2013.01); *H04M 1/725* (2013.01); *H04M 15/56* (2013.01); *H04L 12/1485* (2013.01); *H04W 76/026* (2013.01)
USPC .......................................... 370/352; 370/419

(58) Field of Classification Search
CPC ..... H04L 12/66; H04L 12/28; H04L 65/1069; H04L 65/1073; H04L 65/10; H04M 3/42
USPC .............. 455/436, 435.1, 437, 438, 450, 451, 455/452, 524, 525; 370/352, 400, 353, 329, 370/330, 331, 395.21, 395.4, 356, 392, 401, 370/338; 379/210.02, 265.01–265.14, 379/266.01–266.1, 88.21, 93.35, 142.08, 379/215.01
See application file for complete search history.

(56) References Cited

U.S. PATENT DOCUMENTS

| 6,693,894 B1 * | 2/2004 | Andersson et al. ........... 370/352 |
| 7,245,612 B2 * | 7/2007 | Petty et al. .................... 370/356 |
| 7,876,744 B2 * | 1/2011 | Kwon ........................... 370/353 |
| 8,477,766 B2 * | 7/2013 | Kwon ........................... 370/353 |
| 8,477,785 B2 * | 7/2013 | Kant et al. .................... 370/392 |
| 8,499,087 B2 * | 7/2013 | Hu ................................. 709/229 |
| 8,675,855 B2 * | 3/2014 | Dolan et al. ............. 379/210.02 |
| 2011/0270722 A1 * | 11/2011 | Cai et al. ......................... 705/34 |

* cited by examiner

*Primary Examiner* — Hanh N Nguyen
(74) *Attorney, Agent, or Firm* — Winston Hsu; Scott Margo

(57) ABSTRACT

A method of handling a voice over internet protocol (VoIP) function of a mobile device in a wireless communication system is disclosed. The method comprises arranging a user interface in the mobile device, for a user of the mobile device to control the VoIP function via the user interface; and processing a requested data connection between the mobile device and a network of the wireless communication system according to the VoIP function, when the requested data connection is determined to be a VoIP connection.

16 Claims, 9 Drawing Sheets

METHOD OF HANDLING A VOIP CONNECTION OF A MOBILE DEVICE AND RELATED COMMUNICATION DEVICE

CROSS REFERENCE TO RELATED APPLICATIONS

This application claims the benefit of U.S. Provisional Application No. 61/525,206, filed on Aug. 19, 2011 and entitled "Method of roaming with VoIP service", the contents of which are incorporated herein in their entirety.

BACKGROUND OF THE INVENTION

1. Field of the Invention

The present invention relates to a method used in a wireless communication system and related communication device, and more particularly, to a method of handling a VoIP connection of a mobile device and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Since large amount of features such as multimedia message, video call, conference call, gaming, file sharing, etc., are supported, a voice over internet protocol (VoIP) service has become more and more popular. Different from a traditional voice service (i.e., a voice call) which is a circuit switched (CS) service, the VoIP service is a packet switched (PS) service and is provided via a data connection, wherein the PS service is supported by the UMTS, the LTE system and the LTE-A system. That is, the data connection is established between a user equipment (UE) and a network in a wireless communication system, for transmitting packets generated for the VoIP service. Besides, the data connection is used for transmitting packets generated for a data service which can be a social network application, a weather application, a stock application, or a messenger application. In general, these applications not only generate the packets when being in an active mode (i.e., operated by a user of the UE), but also generate the packets when being in an idle mode (i.e., executed in background). Thus, the UE (or the user of the UE) may disable a data connection function controlling one or more data connections, to avoid the packets being transmitted unexpectedly and a high network fee is caused. This is especially true when the UE is not in a home network of the UE, i.e., the UE is roaming. Since the network fee is extremely high (i.e., the UE is overly charged) when the UE is roaming, the user prefers to disable the data connection function when the UE is going to leave the home network (prepare to roam).

However, since the VoIP service is performed via the data connection, and cannot be performed when the data connection function is disabled. Inconvenience is caused to the user. For example, the user may simply give up using the VoIP service. Alternatively, the user may need to enable the data connection function, perform the VoIP service, and then disable the data connection function, to avoid being charged overly. Therefore, how to solve the inconvenience caused when using the VoIP service without being charged overly (especially when the UE is roaming) is a topic to be discussed

SUMMARY OF THE INVENTION

The present invention therefore provides a method and related communication device for handling a VoIP connection of a mobile device to solve the abovementioned problem.

A method of handling a voice over internet protocol (VoIP) function of a mobile device in a wireless communication system is disclosed. The method comprises arranging a user interface in the mobile device, for a user of the mobile device to control the VoIP function via the user interface; and processing a requested data connection between the mobile device and a network of the wireless communication system according to the VoIP function, when the requested data connection is determined to be a VoIP connection.

A method of handling a voice over internet protocol (VoIP) function of a mobile device in a wireless communication system is disclosed. The method is utilized in a network of the wireless communication system, and comprises receiving access point name (APN) data comprising a configuration of the VoIP function from the mobile device, when the mobile device performs a registration with the network; and processing a requested data connection between the mobile device and the network according to the configuration of the VoIP function, when the requested data connection is determined to be a VoIP connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
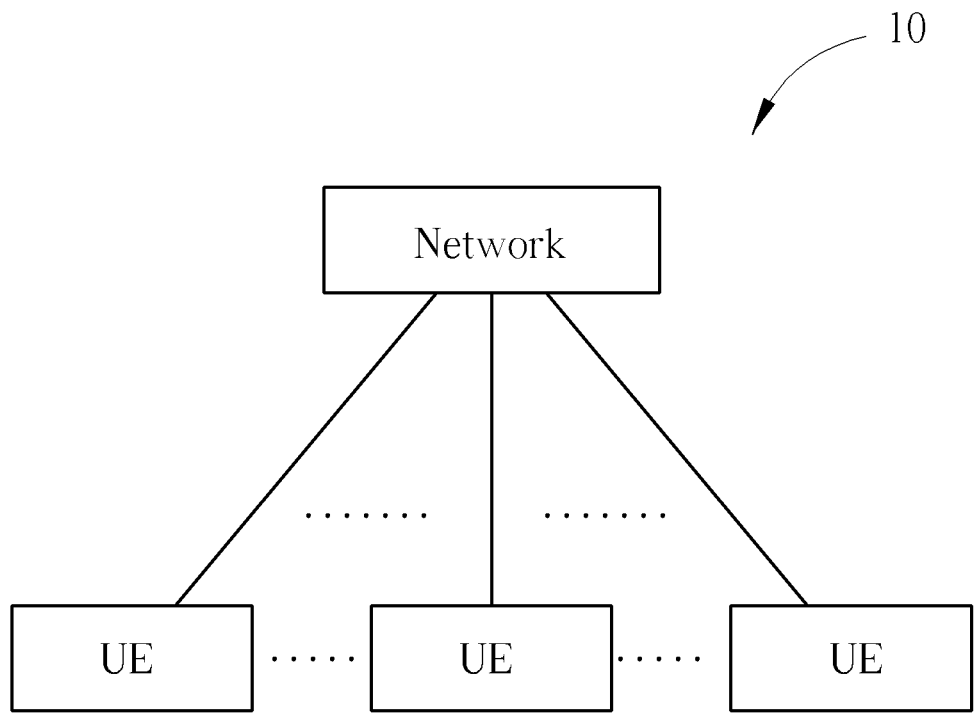
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a plurality of UEs and a network. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a successor of the LTE-A system.

Besides, the UE or the network can establish and release a data connection between the UE and the network, when a data connection function controlling the data connection is enabled. Thus, when the data connection is established, the UE can perform a voice over internet protocol (VoIP) service via the data connection. For example, the VoIP service can include a VoIP call which can be a video call and a conference call, and is not limited.

Figure 2:
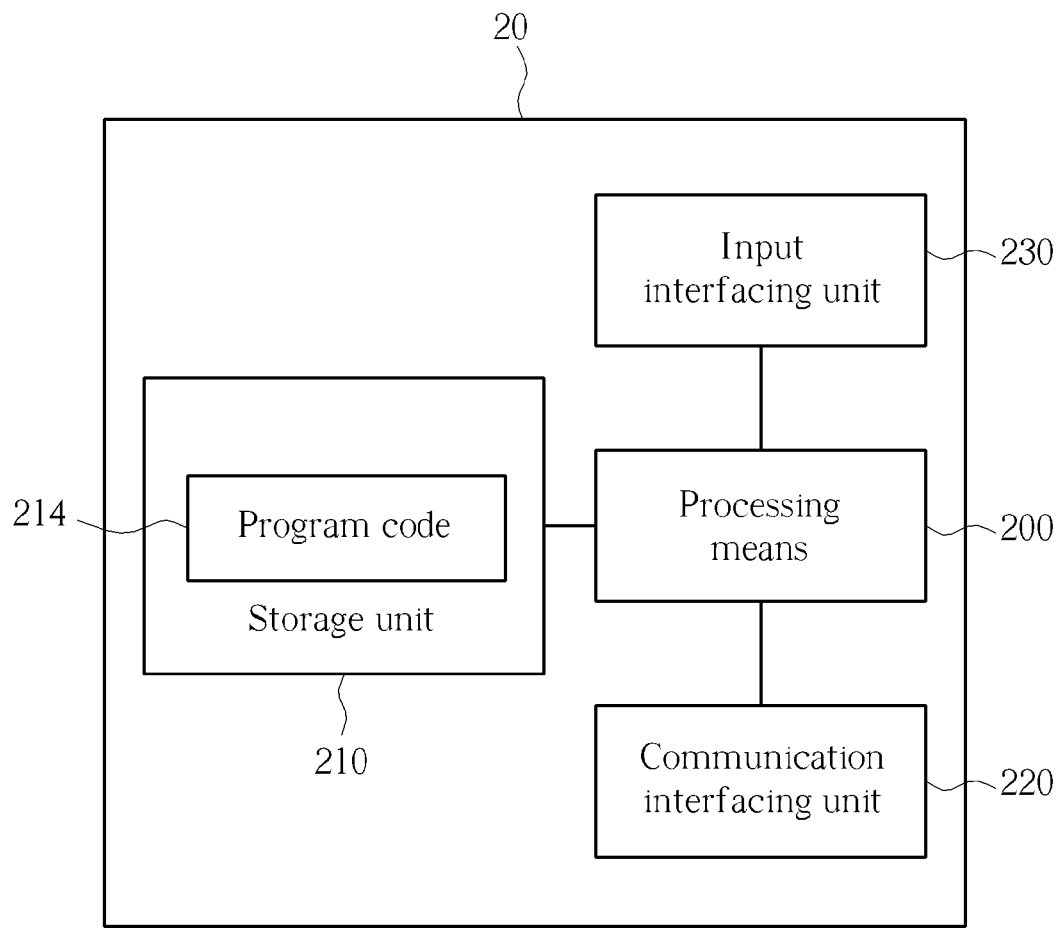
FIG. 2 is a schematic diagram of a communication device according to an example of the present invention.

Please refer to FIG. 2, which is a schematic diagram of a communication device 20 according to an example of the present invention. The communication device 20 can be used for realizing a UE or the network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver, and can transmit and receive wireless signals according to processing results of the processing means 200. Besides, when the communication device 20 is used for realizing the UE, the communication device 20 may further include an input interfacing unit 230. The input interfacing unit 230 can be a hardware button, a hardware controller or a touch screen (i.e., touch panel). The processing means 200 can receive a user's input via the input interfacing unit 230, to control functions of the communication device 20 according to the user's input. For example, the function can include enabling and disabling a data connection function, and is not limited.

Figure 3:
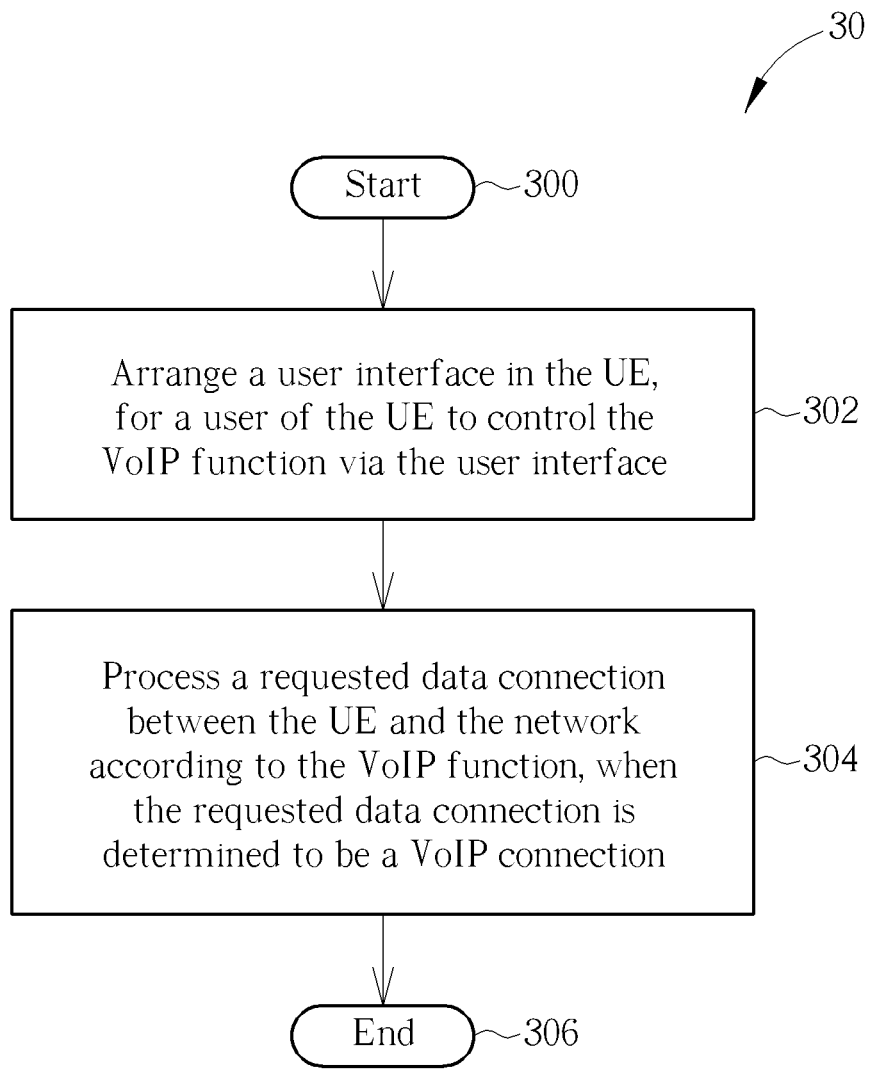
FIG. 3 is a flowchart of a process according to an example of the present invention.

Please refer to FIG. 3, which is a flowchart of a process 30 according to an example of the present invention. The process 30 is utilized in the UE shown in FIG. 1, for handling a VoIP function of the UE. The process 30 may be compiled into the program code 214 and includes the following steps:

Step 300: Start.

Step 302: Arrange a user interface in the UE, for a user of the UE to control the VoIP function via the user interface.

Step 304: Process a requested data connection between the UE and the network according to the VoIP function, when the requested data connection is determined to be a VoIP connection.

Step 306: End.

According to the process 30, a user interface is arranged in the UE, for a user of the UE to control the VoIP function via the user interface. Then, the UE processes a requested data connection between the UE and the network according to the VoIP function, when the requested data connection is determined to be a VoIP connection. In other words, the VoIP connection via which a VoIP service is performed is processed according to a status of the VoIP function, even if a data connection function controlling one or more data connections is disabled. That is, when the requested data connection is determined to be the VoIP connection, the UE processes the VoIP connection according to the status of the VoIP function but not according to a rule (or a setting) for the data connection function. In short, an independent setting for the VoIP connection is used and provided in the UE according to the present invention. Therefore, according to the process 30, even if the data connection function is disabled for reducing a network fee, the user can perform the VoIP service (e.g., VoIP call) via the VoIP connection after the VoIP function is enabled (i.e., turned on). As a result, a problem that the VoIP service cannot be performed when the data connection function is disabled is solved.

Please note that, a spirit of the process 30 is that the UE processes a requested data connection which is determined to be a VoIP connection according to a VoIP function, such that the UE can perform a VoIP service via the VoIP connection even if a data connection function is disabled. Realization of the process 30 is not limited.

In detail, a method according to which the requested data connection is determined to be the VoIP connection is not limited. For example, the requested data connection can be determined to be the VoIP connection, when the requested data connection is transmitted via a real-time transport protocol (RTP) layer, a RTP control (RTCP) layer or both the RTP layer and the RTP control layer. Alternatively, the requested data connection can be determined to be the VoIP connection, when a packet data protocol (PDP) context for the requested data connection indicates that the requested data connection is the VoIP connection. That is, quality of service (QoS) information (e.g., assigned router, assigned server, IP address, etc.) corresponding to the requested data connection is included in the PDP context for the requested data connection, and can be different for different types of data connections. Thus, whether the requested data connection is the VoIP connection can be determined according to the QoS information.

Besides, a method according to which the UE processes the requested data connection when the requested data connection is determined to be the VoIP connection is not limited. For example, the user interface can be arranged for a user of the UE to enable or disable the VoIP function. Then, the UE can accept the requested data connection, if the requested data connection is determined to be the VoIP connection and also the VoIP function is enabled; the UE can reject the data connection, if the requested data connection is determined to be the VoIP connection and also the VoIP function is disabled. That is, if the VoIP function is enabled and the UE (or the user of the UE) tries to perform the VoIP service (e.g., a VoIP call), the UE accepts the VoIP connection and the VoIP service is performed successfully via the VoIP connection. In contrast, if the VoIP function is disabled and the UE (or the user of the UE) tries to perform the VoIP service (e.g., the VoIP call), the UE rejects the VoIP connection and the VoIP service is not performed. Furthermore, except that the UE can process the VoIP connection initiated by the UE (e.g., a mobile originated (MO) VoIP call) according to the VoIP function, the UE can also process the VoIP connection initiated by another UE (e.g., a mobile terminated (MT) VoIP call) for communicating with the UE according to the VoIP function. For example, when a VoIP connection is requested by another UE for a VoIP service to communicate with the UE, the UE can accept/reject the VoIP connection (and thus the VoIP service) if the VoIP function is enabled/disabled, respectively.

Figure 4:
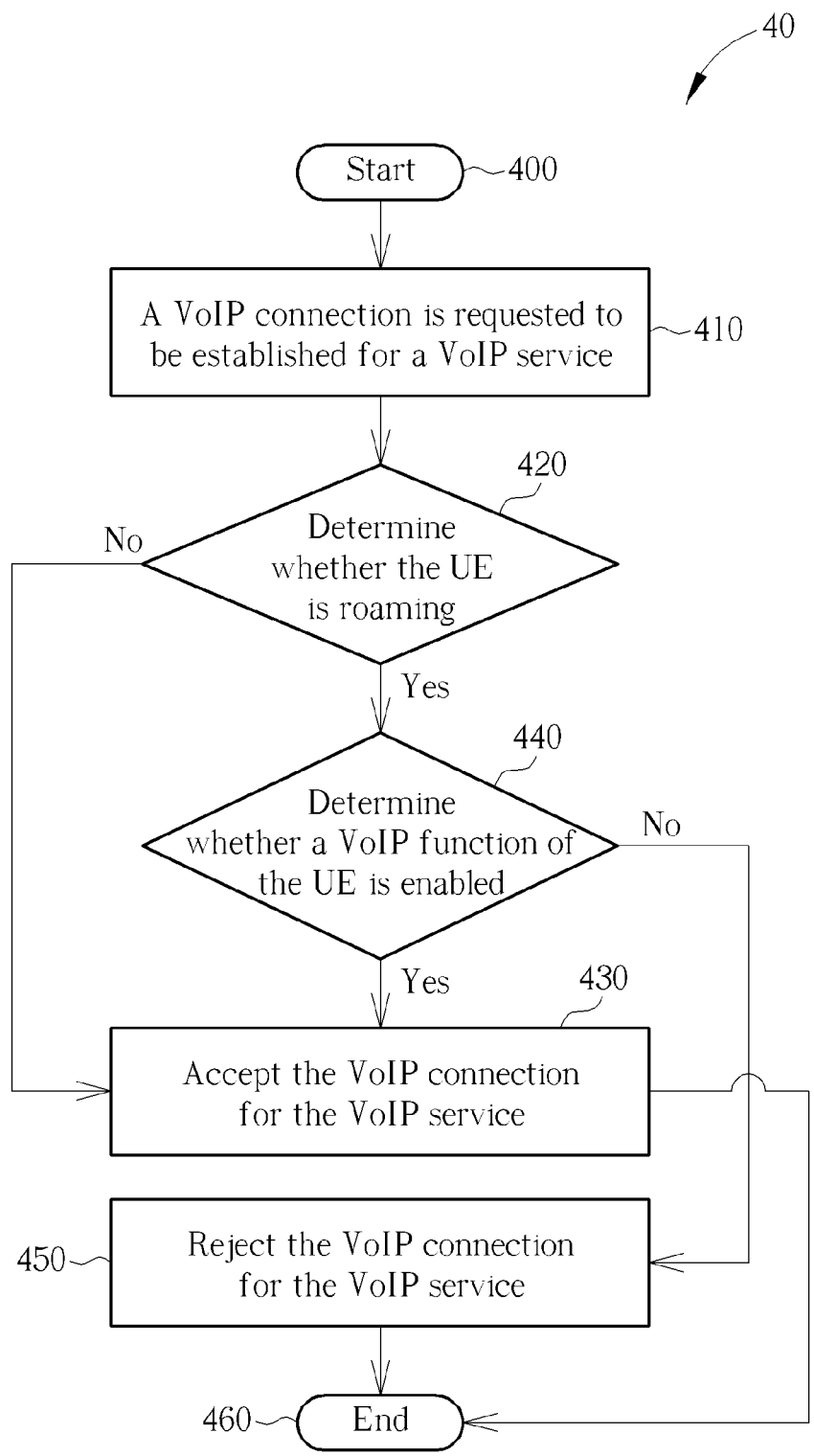
FIG. 4 is a flowchart of a process according to an example of the present invention.

Please note that, the above description can be realized when the UE is not in a home network of the UE, i.e., the UE is roaming. Please refer to FIG. 4, which is a flowchart of a process 40 according to an example of the present invention. The process 40 is utilized in the UE shown in FIG. 1, for handling a VoIP function of the UE when the UE is roaming. According to the process 40, when a VoIP connection is requested to be established for a VoIP service (Step 410), the UE first determines whether it is roaming (Step 420). Note that, the VoIP connection may be initiated by the UE itself, or may be initiated by another UE for communicating with the UE. If the UE is not roaming (i.e., in the home network), the UE can accept the VoIP connection to perform the VoIP service (Step 430), e.g., a network fee is considered acceptable when the UE is in the home network. Otherwise, the UE continues to determine whether a VoIP function of the UE is enabled (Step 440). If the VoIP function is enabled, the UE accepts the VoIP connection to perform the VoIP service (Step 430). Otherwise, if the VoIP function is disabled, the UE rejects the VoIP connection and the VoIP service is not performed (Step 450). Thus, according to the process 40, the process 30 and related description can be realized only when the UE is roaming, and the UE can simply perform the VoIP service without checking the VoIP function when the UE is not roaming.

Please note that, when the UE is roaming, i.e., the network in FIG. 1 is not the home network of the UE, the network may trigger the user interface, for the user to control the VoIP function. For example, a "Yes/No" option for controlling the VoIP function can be displayed on the UE. Thus, the user can select "Yes" for enabling the VoIP function, or can select "No" for disabling the VoIP function, e.g., via the input interfacing unit 230 shown in FIG. 2.

Figure 5:
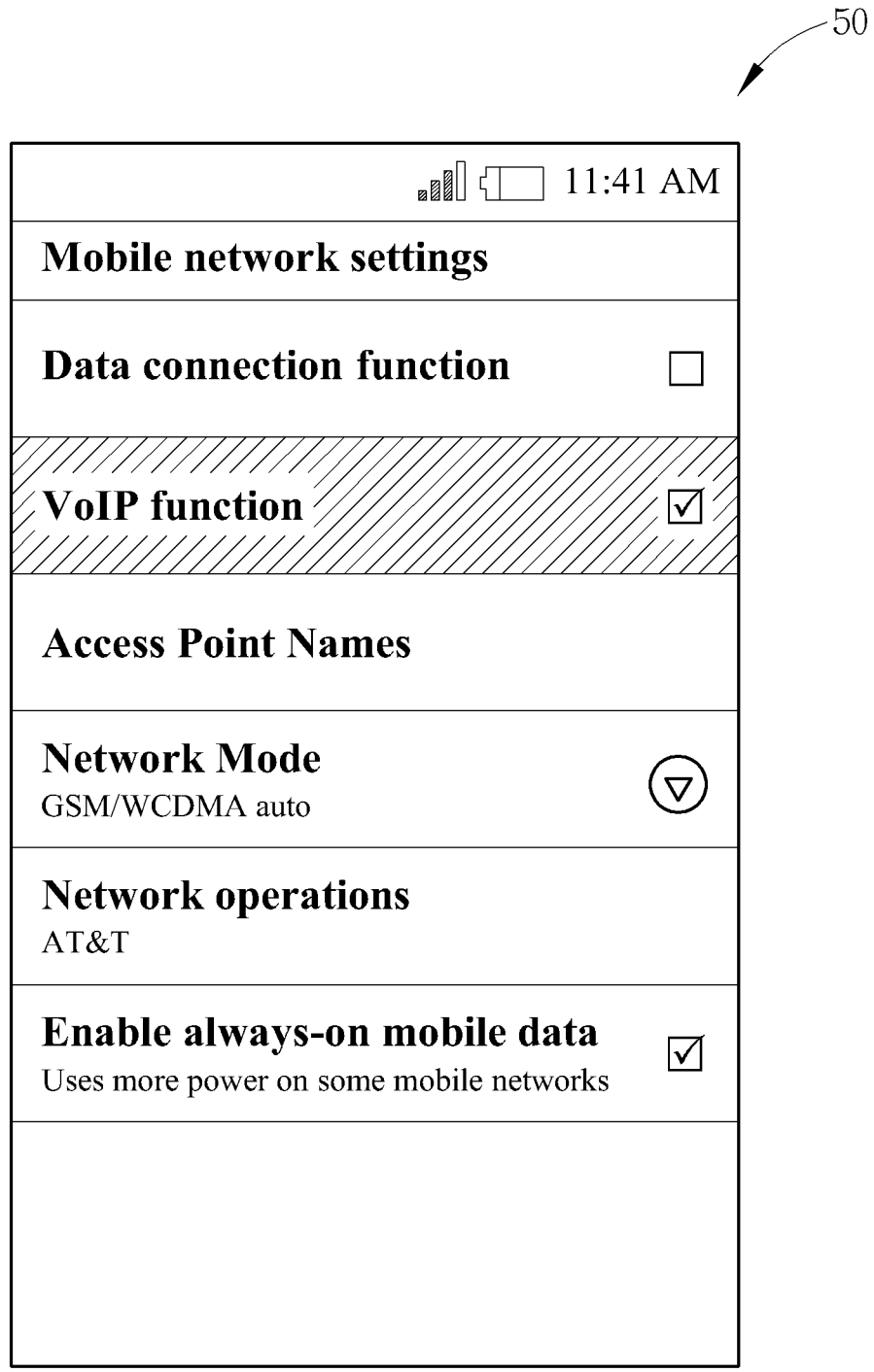
FIG. 5 is a schematic diagram of a screenshot of the UE according to the present invention.
Figure 6:
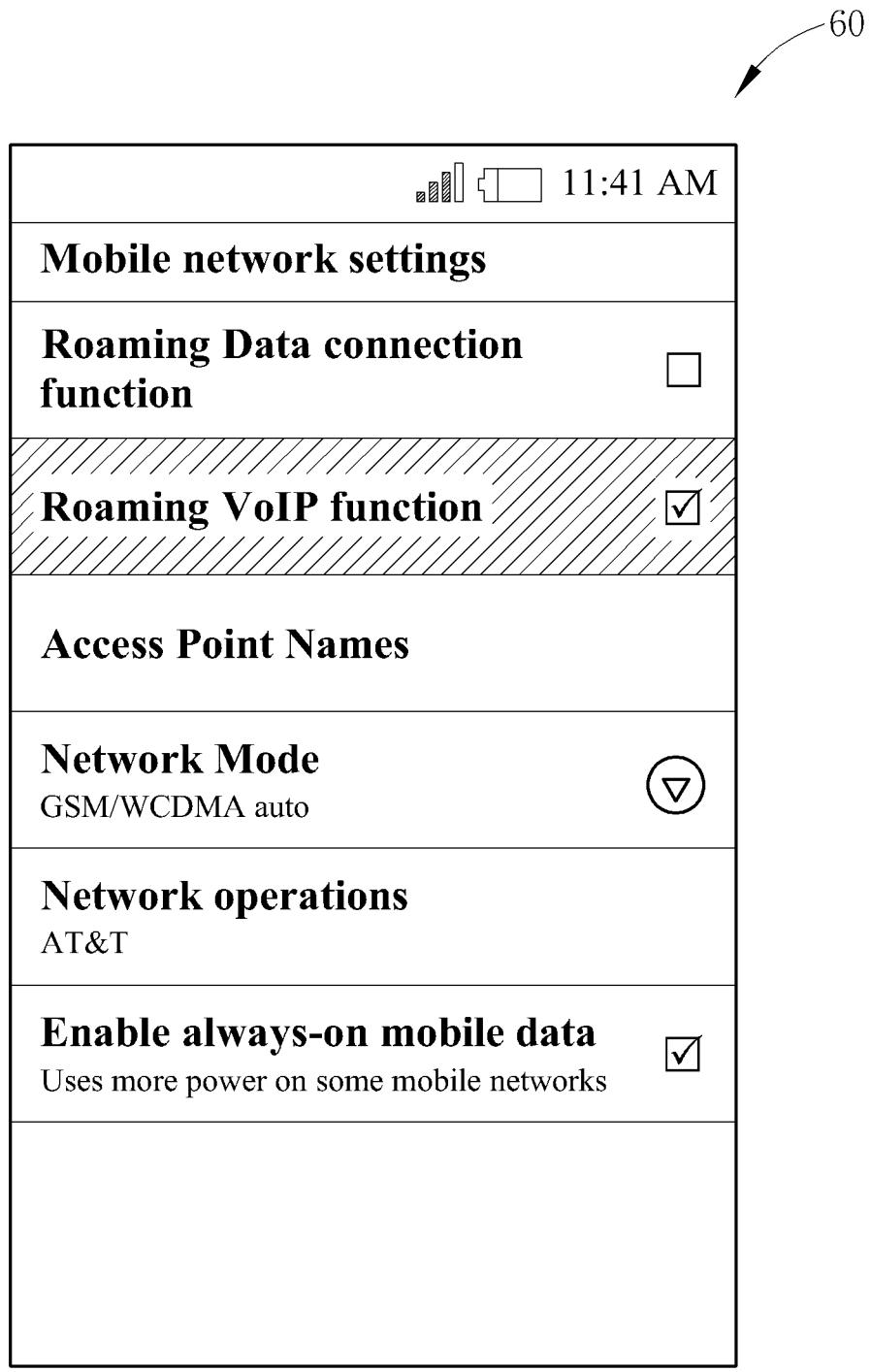
FIG. 6 is a schematic diagram of a screenshot of the UE according to the present invention.

On the other hand, the user interface can be an icon (i.e., a shortcut) or an option displayed on the UE, and is used by a user of the UE to control the VoIP connection. Please refer to FIG. 5, which is a schematic diagram of a screenshot 50 of the UE according to the present invention. As shown in the screenshot 50, the VoIP function is enabled (i.e., checked) while the data connection function is disabled. Thus, even if the data connection function is disabled, the UE can still establish a data connection which is determined to be a VoIP connection for a VoIP service according to the VoIP function. Besides, a position at which the VoIP function is located is not limited, and can be related to a status of the UE. For example, please refer to FIG. 6, which is a schematic diagram of a screenshot 60 of the UE according to the present invention. As shown in the screenshot 60, a VoIP roaming function is enabled (i.e., checked) while a data connection roaming function is disabled. That is, the present invention is realized for a roaming UE in this example. Thus, when the UE is roaming, the UE can still perform the VoIP service via the VoIP connection while the data connection cannot be established to save the network fee. Please note that, the user interface can be controlled (i.e., triggered) by using the hardware button, the hardware controller or the touch screen of the UE, and is not limited thereto.

In general, whether a VoIP connection is initiated by the UE or another UE, the VoIP connection (from/to the UE) is established via (i.e., across) the network. Thus, the network can assist the UE to process the VoIP connection according to a VoIP function of the UE.

Figure 7:
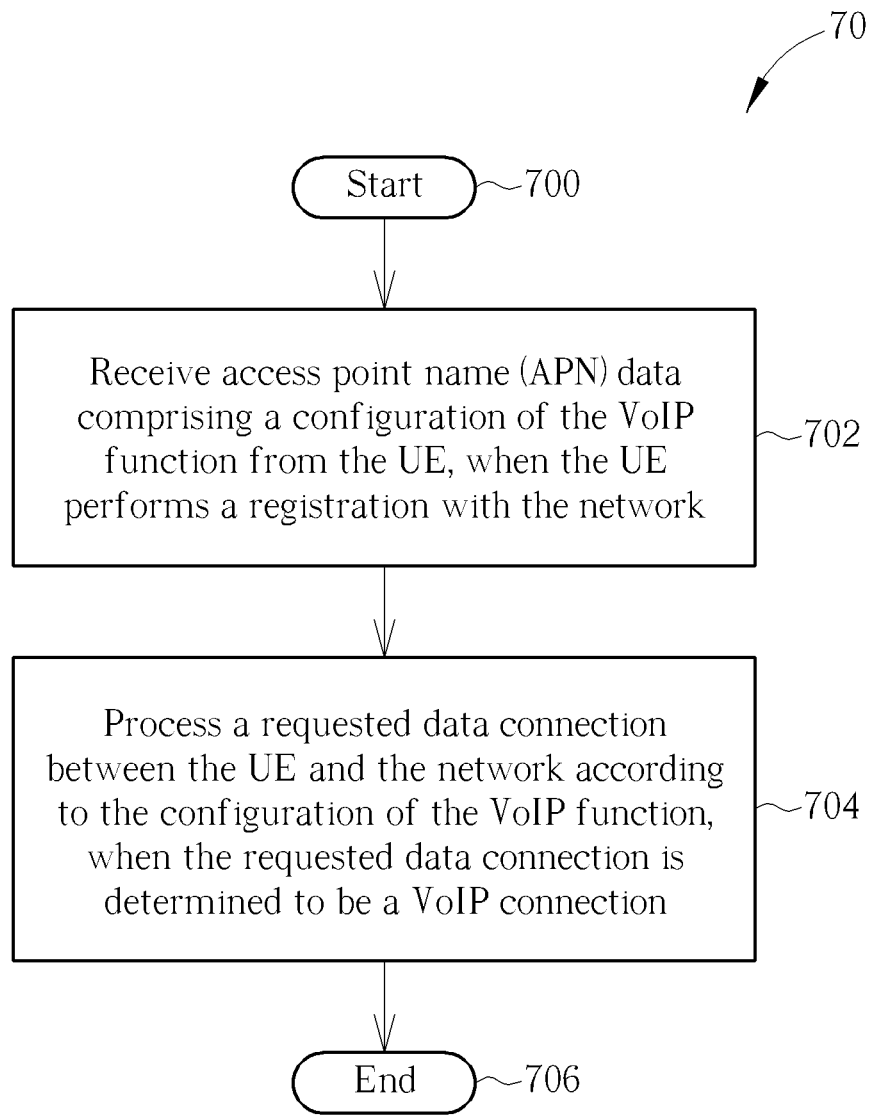
FIG. 7 is a flowchart of a process according to an example of the present invention.

Please refer to FIG. 7, which is a flowchart of a process 70 according to an example of the present invention. The process 70 is utilized in the network shown in FIG. 1, for handling a VoIP function of the UE. The process 70 may be compiled into the program code 214 and includes the following steps:

Step 700: Start.

Step 702: Receive access point name (APN) data comprising a configuration of the VoIP function from the UE, when the UE performs a registration with the network.

Step 704: Process a requested data connection between the UE and the network according to the configuration of the VoIP function, when the requested data connection is determined to be a VoIP connection.

Step 706: End.

According to the process 70, the network receives APN data comprising a configuration of the VoIP function from the UE, when the UE performs a registration with the network. Then, the network processes a requested data connection between the UE and the network according to the configuration of the VoIP function, when the requested data connection is determined to be a VoIP connection. In other words, when the requested data connection is determined to be the VoIP connection, the network processes the VoIP connection according to the configuration (e.g., enabling/disabling) of the VoIP function received from the UE but not according to a rule (or a setting) for a data connection function controlling one or more data connections. In short, an independent setting for the VoIP connection is used by the network according to the present invention. Therefore, according to the process 70, even if the data connection function is disabled by the UE for reducing a network fee, the user can perform the VoIP service (e.g., VoIP call) via the VoIP connection after transmitting the configuration of the VoIP function which is enabled to the network via transmitting the APN data. As a result, a problem that the VoIP service cannot be performed when the data connection function is disabled is solved.

Please note that, a spirit of the process 70 is that the UE transmits APN data including a configuration of a VoIP function of the UE to the network such that the network can process a requested data connection which is determined to be a VoIP connection, according to the configuration of the VoIP function. Thus, the UE can perform a VoIP service via the VoIP connection even if a data connection function is disabled. The manner for realization of the process 70 is not limited.

In detail, a method according to which the requested data connection is determined to be the VoIP connection is not limited. For example, the requested data connection can be determined to be the VoIP connection, when the requested data connection is transmitted via a RTP layer, a RTPC layer or both the RTP layer and the RTP control layer. Alternatively, the requested data connection can be determined to be the VoIP connection, when a PDP context for the requested data connection indicates that the requested data connection is the VoIP connection. Detail of the PDP context can be referred to the abovementioned description, and is not narrated herein.

Besides, a method according to which the network processes the requested data connection when the requested data connection is determined to be the VoIP connection is not limited. For example, the network can accept the requested data connection, if the requested data connection is determined to be the VoIP connection and also the configuration of the VoIP function indicates that the VoIP function is enabled; the network can reject the requested data connection, if the requested data connection is determined to be the VoIP connection and also the configuration of the VoIP function indicates that the VoIP function is disabled. That is, if the VoIP function is enabled and the UE (or the user of the UE) tries to utilize the VoIP service (e.g., a VoIP call), the network accepts the VoIP connection and the VoIP service is performed successfully via the VoIP connection. In contrast, if the VoIP function is disabled and the UE (or the user of the UE) tries to utilize the VoIP service (e.g., the VoIP call), the network rejects the VoIP connection and the VoIP service is not performed. Furthermore, except that the network can process the VoIP connection initiated by the UE (e.g., a MO VoIP call) according to the configuration of the VoIP function, the network can also process the VoIP connection initiated by another UE (e.g., a MT VoIP call) for communicating with the UE according to the configuration of the VoIP function. For example, when a VoIP connection is requested by another UE for a VoIP service to communicate with the UE, the network can accept/reject the VoIP connection (and thus the VoIP service) if the configuration of the VoIP function indicates that the VoIP function is enabled/disabled, respectively.

Figure 8:
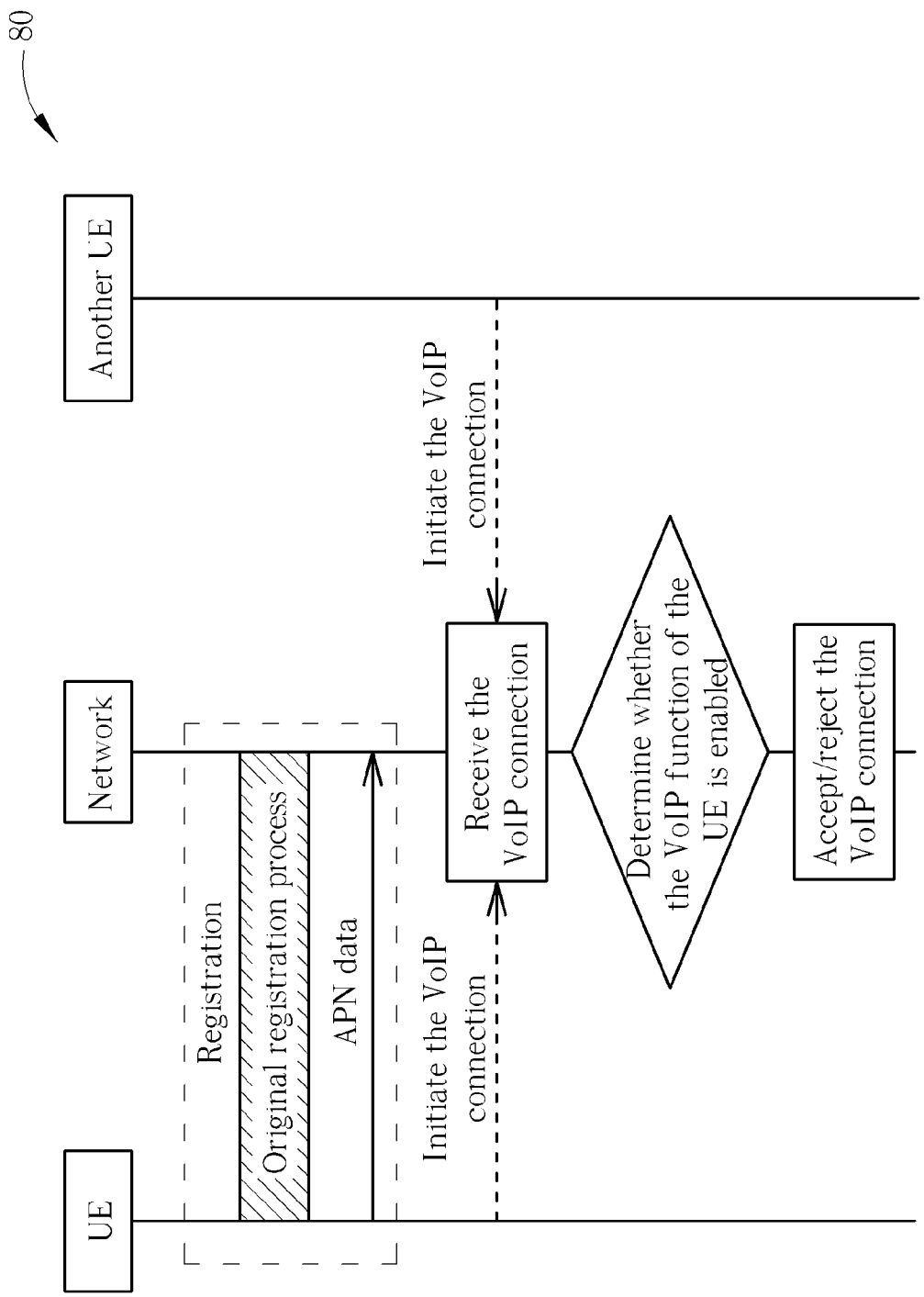
FIG. 8 is a flowchart of a process according to an example of the present invention.

The abovementioned description can be summarized into a process 80 as shown in FIG. 8. According to the process 80, the UE transmits APN data comprising a configuration (i.e., status) of the VoIP function to the network when the UE performs a registration with the network, wherein the APN data is transmitted after performing an original registration process. Then, the configuration of the VoIP function is stored in the network (e.g., a server of the network). Thus, when the VoIP connection for a VoIP service of the UE is prepared to be established (by the UE or another UE) via the network, the network can process (e.g., accept/reject) the VoIP connection according to the configuration of the VoIP function.

Figure 9:
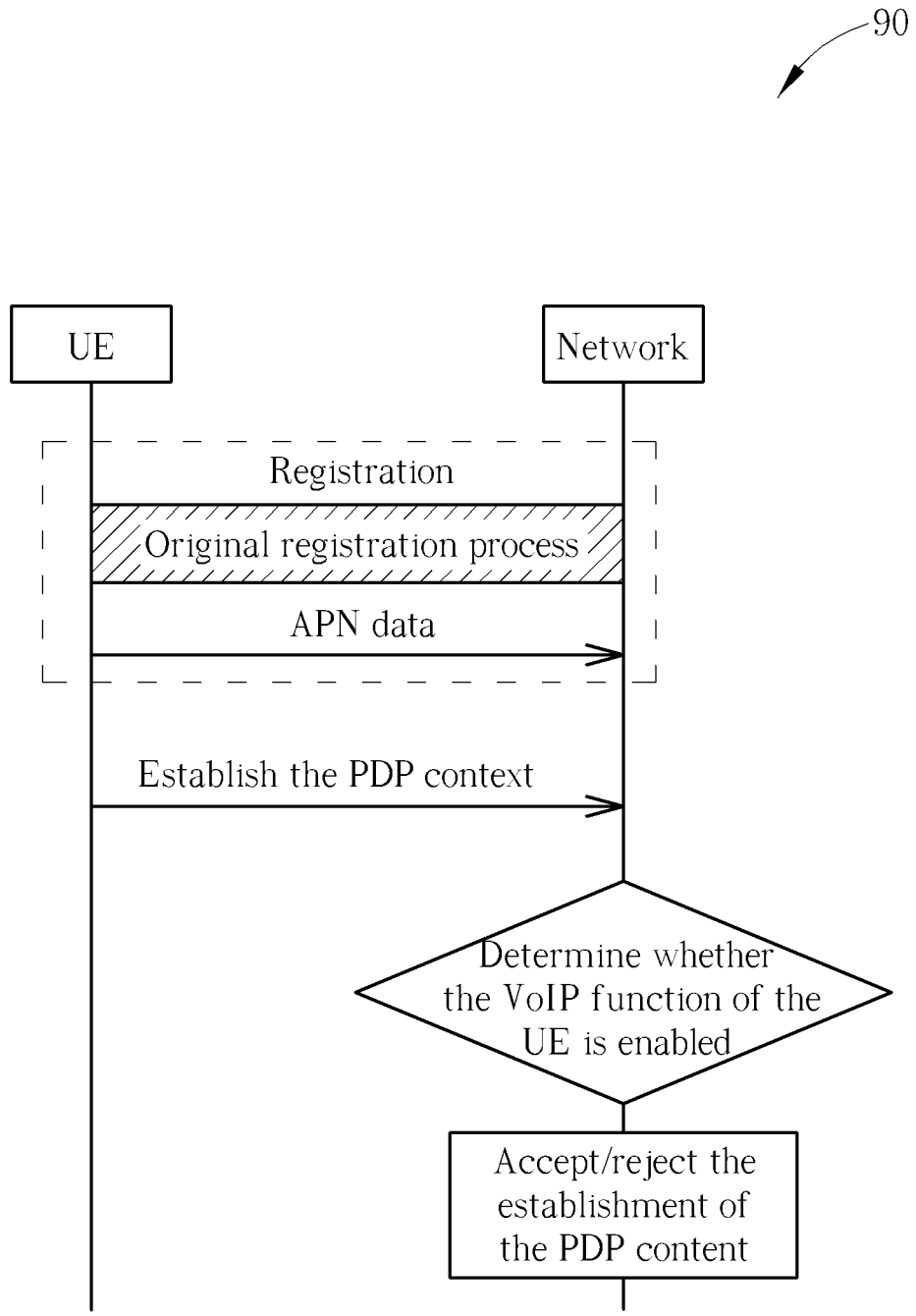
FIG. 9 is a flowchart of a process according to an example of the present invention.

Besides, the network can accept/reject the VoIP connection by processing a PDP context for the VoIP connection. In detail, please refer to FIG. 9, which is a flowchart of a process 90 according to an example of the present invention. The process 90 is utilized in the UE and the network shown in FIG. 1, for handling a VoIP function of the UE. In general, the PDP context for the VoIP connection should be established before establishing the VoIP connection. For example, the PDP context for the VoIP connection can be established after the registration. Alternatively, the PDP context for the VoIP connection can be established when the VoIP connection is prepared to be established. Thus, the network can accept the requested data connection by accepting establishment of the PDP context for the data connection; the network can reject the requested data connection by rejecting the establishment of the PDP context for the data connection. As a result, resources used for trying to establish the VoIP connection can be saved when the VoIP function is disabled, since the PDP context has been rejected earlier.

Please note that, the above description can be directly realized in the network which is not a home network of the UE, i.e., the UE is roaming. In this situation, the network may trigger the user interface, for the user to control the VoIP function. For example, a "Yes/No" option for controlling the VoIP function can be displayed on the UE. Thus, the user can select "Yes" for enabling the VoIP function, or can select "No" for disabling the VoIP function, e.g., via the input interfacing unit 230 shown in FIG. 2. Alternatively, the network can simply determine (or even configure) that the VoIP function is enabled without considering the configuration of the VoIP function, while a notification may be displayed on the UE, to notify the user that the VoIP function is determined (or configured) enabled.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling a VoIP connection of a UE. A user of the UE can control the VoIP connection by enabling/disabling a VoIP function, such that the UE can perform a VoIP service via the VoIP connection even if a data connection function of the UE is disabled. Then, the VoIP connection can be processed (e.g., accepted/rejected) by either the UE or the network according to whether the VoIP function is enabled/disabled. Thus, convenience of the UE is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a voice over internet protocol (VoIP) function of a mobile device in a wireless communication system, the method comprising:
   arranging a user interface in the mobile device, for a user of the mobile device to enable or disable the VoIP function via the user interface, wherein an enable/disable status of the VoIP function is independent of a setting of a data connection function of the mobile device; and
   accepting a requested data connection between the mobile device and a network of the wireless communication system, when the requested data connection is determined to be a VoIP connection and the VoIP function is enabled via the user interface, even when the data connection function is disabled.

2. The method of claim 1, wherein the requested data connection is determined to be the VoIP connection, when the requested data connection is transmitted via at least one of a real-time transport protocol (RTP) layer and a RTP control (RTCP) layer.

3. The method of claim 1, wherein the requested data connection is determined to be the VoIP connection, when a packet data protocol (PDP) context for the requested data connection indicates that the requested data connection is the VoIP connection.

4. The method of claim 1, further comprising:
   rejecting the requested data connection, when the requested data connection is determined to be the VoIP connection and the VoIP function is disabled via the user interface.

5. The method of claim 1, wherein the requested data connection is a mobile originated call or a mobile terminated call of the mobile device.

6. The method of claim 1, wherein the network is not a home network of the mobile device.

7. The method of claim 6, wherein the user interface is triggered by the network, for the user to enable or disable the VoIP function via the user interface.

8. A method of handling a voice over internet protocol (VoIP) function of a mobile device in a wireless communication system, the method utilized in a network of the wireless communication system and comprising:

receiving access point name (APN) data comprising a configuration of the VoIP function from the mobile device, when the mobile device performs a registration with the network, wherein the configuration of the VoIP function is independent of a setting of a data connection function of the mobile device; and accepting a requested data connection between the mobile device and the network, when the requested data connection is determined to be a VoIP connection and the configuration of the VoIP function indicates that the VoIP function is enabled, even when the data connection function is disabled.

9. The method of claim 8, wherein the requested data connection is determined to be the VoIP connection, when the requested data connection is transmitted via at least one of a real-time transport protocol (RTP) layer and a RTP control (RTCP) layer.

10. The method of claim 8, wherein the requested data connection is determined to be the VoIP connection, when a packet data protocol (PDP) context for the requested data connection indicates that the requested data connection is the VoIP connection.

11. The method of claim 8, further comprising:

rejecting the requested data connection, when the requested data connection is determined to be the VoIP connection and the configuration of the VoIP function indicates that the VoIP function is disabled.

12. The method of claim 11, wherein the network accepts the requested data connection by accepting establishment of a PDP context for the requested data connection, and rejects the requested data connection by rejecting the establishment of the PDP context for the requested data connection.

13. The method of claim 8, wherein the requested data connection is a mobile originated call or a mobile terminated call of the mobile device.

14. The method of claim 8, wherein the network is not a home network of the mobile device.

15. The method of claim 14, further comprising:

triggering a user interface, for a user of the mobile device to control the VoIP function via the user interface.

16. The method of claim 14, wherein the network determines that the VoIP function is enabled without considering the configuration of the VoIP function.

\* \* \* \* \*